DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 26, 1971

882 O.G. 1346

T882,018

SPECTRAL SENSITIZATION OF SILVER HALIDE

Gary L. Hiller, Hilton, N.Y.
(Kodak Park, Rochester, N.Y. 14650)

Filed May 14, 1970, Ser. No. 37,302
**Int. Cl. G03c *1/28***
U.S. Cl. 96—104
No Drawing. 27 Pages Specification

Photographic silver halide emulsions are spectrally sensitized with chain rigidized dyes, such as those having one of the following formulas:

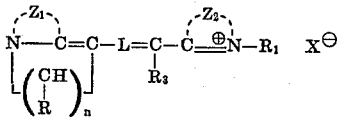

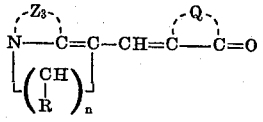

together with a non-rigidized merocyanine dye, containing a 5-pyrazolone nucleus, such as a merocyanine dye of the formula:

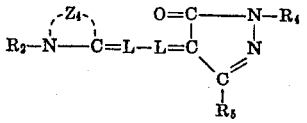

wherein $n$ represents 2 or 3; L represents a methine linkage; R represents hydrogen or lower alkyl or aryl; $R_1$, $R_2$, $R_4$ and $R_5$ each represents alkyl or aryl; $R_3$ represents hydrogen, lower alkyl, aryl or, taken together with $R_1$, alkylene containing 2 to 3 carbon atoms; X represents an acid anion; $Z_1$, $Z_2$, $Z_3$ and $Z_4$ each represents the atoms to complete benzothiazole, naphthothiazole, benzoxazole, naphthoxazole, benzimidazole, naphthimidazole or 3,3-dialkylindolenine nuclei; and, Q represents an acidic nucleus of the type used in merocyanine dyes. Useful chain rigidized dyes include:

5,6-dichloro-3-ethyl-1,8-ethylene-1′,3′,3′-trimethylbenzimidazoloindocarbocyanine iodide
5,6-dichloro-3,3′-diethyl-1,8-ethylenebenzimidazoloxacarbocyanine iodide
5-[3-(1,2-dihydropyrrolo[2,1-b]benzothiazolyl)-methylene-1-ethyl-2-thiobarbituric acid
5,6-dichloro-3,3′-diethyl-1,8-ethylenebenzimidazolothiacarbocyanine iodide
5,6,5′,6′-tetrachloro-3,3′-diethyl-1,8,1′,10-diethylenebenzimidazolocarbocyanine diodide
3,3′-diethyl-1,10-(2,3-propylene) naphtho [2,3-d]-imidazolooxacarbocyanine iodide
3,3′-diethyl-1,8-ethylenebenzimidazolothiacarbocyanine iodide
3′-ethyl-3,8-ethylene-9-methylthiacarbocyanine bromide
3,3′-diethyl-1,10-trimethylenenaphth[2,3-d]imidazolooxacarbocyanine iodide;

and, useful non-rigidized merocyanine dyes include

4-[1-ethyl-2(1)-β-naphthothiazolylidene)isopropylidene]-3-methyl-1-(p-sulfophenyl)-5-pyrazolone
4-[(3-ethyl-2(3)-benzothiazolylidene)isopropyliene]-3-methyl-1-(p-sulfophenyl)-5-pyrazolone
4-[(3-ethyl-2(3)-benzothiazolylidene)ethylidene]-methyl-1-(p-sulfophenyl)-5-pyrazolone.